US009414381B2

(12) United States Patent
Jain

(10) Patent No.: US 9,414,381 B2
(45) Date of Patent: Aug. 9, 2016

(54) DATA AGGREGATION METHOD AND NETWORK ARCHITECTURE FOR ROBUST REAL-TIME WIRELESS INDUSTRIAL COMMUNICATION

(71) Applicant: Robert Bosch GmbH, Stuttgart (DE)

(72) Inventor: Vivek Jain, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 14/212,613

(22) Filed: Mar. 14, 2014

(65) Prior Publication Data

US 2014/0269636 A1 Sep. 18, 2014

Related U.S. Application Data

(60) Provisional application No. 61/791,862, filed on Mar. 15, 2013.

(51) Int. Cl.
*H04J 3/00* (2006.01)
*H04W 72/04* (2009.01)

(52) U.S. Cl.
CPC ................................ *H04W 72/0446* (2013.01)

(58) Field of Classification Search
None
See application file for complete search history.

(56) References Cited

U.S. PATENT DOCUMENTS

| | | | | |
|---|---|---|---|---|
| 7,133,396 | B1 * | 11/2006 | Schmidl | H04L 1/0001 370/337 |
| 8,880,763 | B2 * | 11/2014 | Hata | G03G 15/55 710/110 |
| 9,167,196 | B2 * | 10/2015 | Woods | H04N 5/76 |
| 2001/0055356 | A1 * | 12/2001 | Davies | H04L 12/1868 375/358 |
| 2003/0058826 | A1 | 3/2003 | Shearer, III | |
| 2003/0143953 | A1 * | 7/2003 | Schmandt | H04B 7/2643 455/41.2 |
| 2004/0085981 | A1 * | 5/2004 | Lee et al. | 370/412 |
| 2004/0209628 | A1 * | 10/2004 | Laroia et al. | 455/458 |
| 2005/0220135 | A1 * | 10/2005 | Honda et al. | 370/437 |
| 2005/0276255 | A1 * | 12/2005 | Aiello | H04W 56/0015 370/348 |
| 2007/0133592 | A1 | 6/2007 | Zheng et al. | |
| 2008/0043661 | A1 * | 2/2008 | Park | 370/314 |
| 2008/0123579 | A1 | 5/2008 | Kozat et al. | |
| 2008/0165829 | A1 * | 7/2008 | Lee et al. | 375/130 |
| 2008/0232334 | A1 | 9/2008 | Das et al. | |
| 2008/0293366 | A1 * | 11/2008 | Haartsen | 455/69 |

(Continued)

OTHER PUBLICATIONS

Huang, Yu-Kai et al., Distributed Throughput Optimization for ZigBee Cluster-Tree Networks, published at least as early as Mar. 15, 2012.
International Search Report and Written Opinion corresponding to PCT Application No. PCT/US2014/028898, mailed Jul. 28, 2014 (10 pages).

*Primary Examiner* — Phirin Sam
(74) *Attorney, Agent, or Firm* — Maginot Moore & Beck LLP

(57) ABSTRACT

A wireless data network includes a master wireless node and a plurality of slave wireless nodes that are configured to transmit data using at least two independent channels. A first slave wireless node transmits data to a second slave wireless node using a first independent channel concurrently to a third slave wireless node transmitting data to the master wireless node using a second independent channel during a first time slot, the transmission from the third slave wireless node including a fixed overhead time. The second slave wireless node transmits the data from the first slave wireless node and additional data for the second slave wireless node to the master wireless node during a second time slot, the transmission from the second node including the fixed overhead time.

16 Claims, 12 Drawing Sheets

(56) References Cited

U.S. PATENT DOCUMENTS

| | | |
|---|---|---|
| 2009/0180460 A1* | 7/2009 | Chang et al. .................. 370/345 |
| 2010/0309831 A1* | 12/2010 | Yeh et al. ...................... 370/311 |
| 2011/0228742 A1 | 9/2011 | Honkasalo et al. |
| 2011/0238773 A1* | 9/2011 | Nakamura ............ H04L 12/403 709/208 |
| 2012/0243559 A1* | 9/2012 | Pan ........................ H04J 3/1605 370/503 |
| 2014/0029482 A1* | 1/2014 | Bowman et al. .............. 370/278 |
| 2014/0029485 A1* | 1/2014 | Bowman ................ H04B 15/00 370/280 |
| 2014/0254431 A1* | 9/2014 | Yan ........................ H04Q 11/04 370/255 |

* cited by examiner $$\underbrace{N = \sum_{i=1}^{n+1} |S_i| + x|S_n| + |S_{n+1}|}_{|S_{n+1}| = N - \left(\sum_{i=1}^{n+1} |S_i|\right) + xf + c}$$

$$|S_{n+1}| \le f \qquad |S_n| = f \qquad x = \frac{N - \sum_{i=1}^{n} |S_i|}{f}$$

'Max' Case $$N = (1 + 2 + 4 + \ldots + 2^k) + xf + c$$
$$M = (1+k) + x + 1_{c>0} \qquad \because 2^k \le f$$
$$k = \lfloor (\log_2 f) \rfloor$$
$$x = \left\lfloor \frac{N - (2^{k+1} - 1)}{f} \right\rfloor$$

'Min' Case $$N = (1 + 2 + 3 + 4 + \ldots + y) + xf + c$$
$$M = y + x + 1_{c>0} \quad \text{and} \quad y = \min\left(f, \frac{\sqrt{8N+1} - 1}{2}\right); \quad y = f \quad ; \quad y < f$$
$$x = \left\lfloor \frac{N - \frac{f(f+1)}{2}}{f} \right\rfloor_0 = \left\lfloor \frac{2N}{f} - \frac{(f+1)}{2f} \right\rfloor$$

DATA AGGREGATION METHOD AND NETWORK ARCHITECTURE FOR ROBUST REAL-TIME WIRELESS INDUSTRIAL COMMUNICATION

CLAIM OF PRIORITY

This application claims priority to U.S. Provisional Application No. 61/791,862, which is entitled "Data Aggregation Method and Network Architecture for Robust Real-Time Wireless Industrial Communication," and was filed on Mar. 15, 2013, the entire contents of which are hereby incorporated by reference herein.

TECHNICAL FIELD

This disclosure relates generally to real-time wireless communication systems that are deployed in industrial applications and, more specifically, to robust methods for data collection from slave wireless nodes by the master wireless node within predetermined time bounds.

BACKGROUND

Real-time communication systems include communication systems that guarantee delivery of communication message data within predetermined time limits. Real-time communication systems are used in a wide range of applications, with industrial control systems being one example where real-time communications are important to the successful operation of manufacturing, control, automation, and other industrial processes.

Existing wireless communication systems are not suitable for the real-time operational requirements of industrial applications that include real-time communication requirements between multiple devices. For example, wireless networks including a large number of wireless communication nodes require shared access to a wireless communication medium. In existing wireless communication systems, any node may transmit at any time, with collisions occurring between two or more nodes that transmit simultaneously. Intelligent solutions sense the wireless channel before transmitting to avoid collisions and are thus non-deterministic. Therefore, the existing wireless systems provide no guarantees that each node has an opportunity to transmit a predetermined amount of data within a bounded time period.

Techniques for allocation of a shared communication medium to multiple communication nodes exist, but suffer from inefficiency. As depicted in FIG. 1, a simple brute-force time-division multiple access (TDMA) method guarantees transmission time to each of N slave communication nodes through assignment of one time slot in a series of N equal time slots to each node. Each slave wireless node transmits data to the master wireless node in a designated time slot. The time slots repeat every N slots, and each node waits for the next corresponding time slot to transmit data. For large numbers of nodes N, the time delay between time slots in which a node may transmit data increases until the time delay is unacceptably large for use with the wireless communication network. In FIG. 2, another prior art TDMA system includes multiple radio channels where subsets of the N wireless nodes each communicate using time slots using one of a plurality of independent radio channels. FIG. 2 depicts an example with two radio channels. Multiple radio channels enable the master wireless node to send and receive to N slave wireless nodes, but the additional radio channels require additional wireless frequency spectrum. Implementing a master wireless node that is configured to use a large number of channels concurrently as depicted in FIG. 2 requires more complex hardware that is often impractical in large-scale wireless networks.

While existing TDMA systems enable communication between multiple slave wireless nodes and a master wireless node, inefficiencies in communication remain. For example, in some wireless networks, the slave wireless nodes send short messages including small amounts of data to the master wireless node. Each communication between the master wireless node and a slave wireless node includes a fixed communication overhead, with examples of overhead including communication protocol handshake data, and message preamble data, and connection setup and teardown data for connection based protocols. The time required for the fixed overhead in each transmission is typically independent of the size of the message so, for example, the fixed overhead for a message that includes a single byte of data is typically the same as the fixed overhead for transmitting 1,000 bytes of data. Since a wireless communication network or any other network can only transmit data at a finite speed, the requirement to transfer data as part of the fixed overhead increases the total time required to transmit a message. In some wireless communication networks, the fixed overhead for node-to-node communication forms a substantial fraction of the time required to send and receive data in the wireless network. Consequently, improvements to the configuration of wireless networks that reduce the total fixed overhead for communication during communication between slave wireless nodes and a master wireless node would be beneficial.

SUMMARY

A wireless data network includes a master wireless node and a plurality of slave wireless nodes that are configured to transmit data using at least two independent channels. A first slave wireless node transmits data to a second slave wireless node using a first independent channel concurrently to a third slave wireless node transmitting data to the master wireless node using a second independent channel during a first time slot, the transmission from the third slave wireless node including a fixed overhead time. The second slave wireless node transmits the data from the first slave wireless node and additional data for the second slave wireless node to the master wireless node during a second time slot, the transmission from the second node including the fixed overhead time.

In one embodiment, a method of operating a wireless communication system that includes a plurality of wireless nodes has been developed. The method includes transmitting with a transceiver in a first slave wireless node a first message to a master wireless node during a first predetermined time slot, transmitting with a transceiver in a second slave wireless node a second message to a first intermediate slave wireless node during the first predetermined time slot, and transmitting with a transceiver in the first intermediate slave wireless node a third message including the second message to a master wireless node during a second predetermined time slot, the second predetermined time slot being longer than the first predetermined time slot.

In another embodiment, a method of operating a wireless communication system that includes a plurality of wireless nodes has been developed. The method includes transmitting with a transceiver in a first slave wireless node using a first channel a first message to a master wireless node during a first predetermined time slot, transmitting with a transceiver in a second slave wireless node using a second channel that is different than the first channel a second message to a first intermediate slave wireless node during the first predetermined time slot, transmitting with a transceiver in a third slave wireless node using a third channel that is different than both the first channel and the second channel a third message to a second intermediate slave wireless node during the first predetermined time slot, transmitting with a transceiver in the first intermediate slave wireless node using the first channel a fourth message to the master wireless node during a second predetermined time slot, the fourth message including the second message and the second predetermine time slot being longer than the first predetermined time slot, transmitting with a transceiver in the second intermediate slave wireless node using the second channel a fifth message to a third intermediate slave wireless node during the second predetermined time slot, the fifth message including the third message, and transmitting with a transceiver in the third intermediate slave wireless node using the first channel a sixth message to the master wireless node during a third predetermined time slot, the sixth message including the fifth message and the third predetermined time slot being longer than the second predetermined time slot.

In another embodiment, a method of organizing a wireless communication system that includes a plurality of wireless nodes has been developed. The method includes generating with a controller in a master wireless node assignment data for each slave radio node in a plurality of slave radio nodes to one group in a plurality groups for communication between the slave wireless nodes and the master wireless node in the wireless communication system and transmitting, with a transmitter in the master wireless node the assignment data to the plurality of slave wireless nodes to configure the plurality of slave wireless nodes to transmit messages to the master wireless node according to the assignment data. The generation of the assignment data includes assigning with the controller a first slave wireless node in the plurality of slave wireless nodes to a first group in the plurality of groups, the first slave wireless node being configured to transmit a first message to the master wireless node using a first channel during a first predetermined time slot, and assigning with the controller a second slave wireless node and a third slave wireless node in the plurality of slave wireless nodes to a second group in the plurality of groups, the second slave wireless node being configured to transmit a second message to the third slave wireless node using a second channel during the first time slot and the third slave wireless node being configured to transmit a third message that includes the second message to the master wireless node using the first channel during a second predetermined time slot, the second predetermined time slot being longer than the first time slot.

BRIEF DESCRIPTION OF THE DRAWINGS

FIG. 10 depicts equations that are used to generate the arrangements of master wireless node and slave wireless nodes that are depicted in FIG. 5A-FIG. 9.

DETAILED DESCRIPTION

Figure 1:
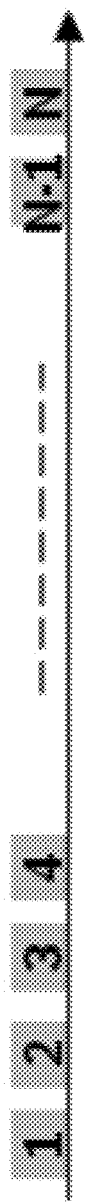
FIG. 1 is a prior art diagram of a series of time slots that are used in a time division multiple access (TDMA) communication process between a master wireless node and multiple slave wireless nodes.
Figure 2:
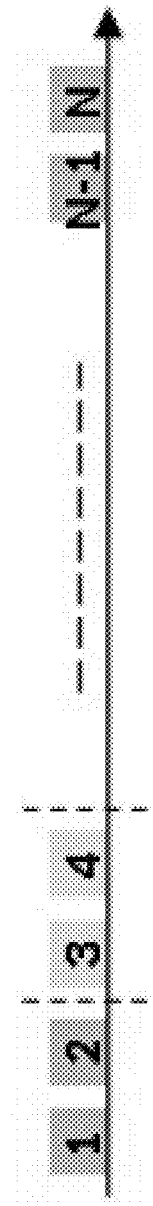
FIG. 2 is a prior art diagram of two sets of time slots that correspond to two independent communication channels that are used in a TDMA communication process between a master wireless node, a first set of slave wireless nodes using the first communication channel, and a second set of slave wireless nodes using the second communication channel.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

In the discussion below, a master wireless node communicates with a plurality of slave wireless nodes. In one embodiment, the master wireless node includes a radio receiver and each of the slave wireless nodes includes a radio transmitter, although in many embodiments each of the master wireless node and slave wireless nodes includes a radio transceiver that is configured to transmit or receive data. Each of the wireless nodes in the network includes a memory that stores messages for transmission and in the case of the master wireless node and some of the slave wireless nodes, stores messages that are received from other slave wireless nodes for transmission to another slave wireless node or transmission to the master wireless node. Each of the wireless nodes also include a controller such as a microprocessor, microcontroller, digital signal processor, field programmable gate array, application specific integrated circuit, or any other suitable digital processing device. The controller in each wireless node executes stored program instructions to generate data messages for transmission, and to control the operation of the wireless transceiver to send and receive message data according to the embodiments described herein.

As used herein, the term "master wireless node" refers to a node in a wireless communication system that is configured to receive data from multiple wireless nodes, including data that pass through one or more intermediate wireless nodes prior to reaching the master wireless node. In some embodiments the master wireless node also transmits data to slave wireless nodes to arrange the slave wireless nodes into groups and control the operation of the slave wireless nodes. The term "slave wireless node" refers to one of the wireless nodes that is in communication with either another slave wireless node or the master wireless node. As used herein, a "leaf wireless node" is a wireless node that transmits data corresponding to its own operation but does not transmit data from other nodes. As used herein, the term "intermediate slave wireless node" is a slave wireless node that transmits data corresponding to its own operation and data from at least one other leaf wireless node or other intermediate wireless node. As used herein, a "group leader" is an intermediate slave wireless node in a group of nodes that transmits data from each node in the group, including its own data, to the master wireless node. The slave wireless nodes typically have an operating mode where each slave wireless node transmits data only to an intermediate slave wireless node or the master wireless node.

As used herein, the term "channel" refers to any communication path between wireless nodes in a wireless communication system that enables one wireless node to communicate with one or more of the other wireless nodes in the absence of other contemporaneous transmissions that use the same channel. In wireless communication systems that use multiple channels, such as N channels, up to N wireless nodes can transmit concurrently when the N nodes each use a different one of the N channels. One embodiment of channels includes different frequency channels that are available in a larger frequency spectrum where each frequency channel provides sufficient bandwidth for communication without interfering with the other frequency channels. In other embodiments, wireless multiple-access techniques including, but not limited to, orthogonal frequency division multiplexing and code division multiplexing form multiple independent channels for communication in the wireless communication system. Unless otherwise stated, the illustrative embodiments below include nodes that transmit and receive data signals using a single independent channel. Individual nodes in a larger network transmit and receive using different independent channels and two or more nodes transmit data concurrently using different independent channels, but only one node in the network transmits data on a given independent channel at any one time.

In some embodiments, the master wireless node also generates a predetermined order for transmission of the wireless messages from the slave wireless nodes and sends instructions to the slave wireless nodes to control the channel of transmission for each slave wireless node and to group different sets of slave wireless nodes into hierarchies including leaf nodes and intermediate slave wireless nodes. The controller in the master wireless node generates assignments for the different slave wireless nodes and transmits control data to the slave wireless nodes, which then reconfigure themselves to transmit and optionally receive data according to the control data from the master wireless node. The master wireless node optionally generates and transmits new assignments to the slave wireless nodes during operation of the wireless communication system. Different embodiments of the wireless network system configurations for efficient transmission of data from the slave wireless nodes to a master wireless node are described below.

Figure 3:
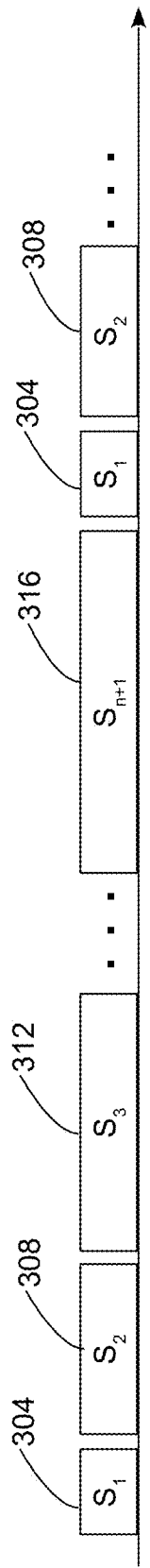
FIG. 3 is a diagram of an arrangement for TDMA time slots where a master wireless node receives aggregated data from a single slave wireless node that includes data received from one or more additional slave wireless nodes.

As depicted in FIG. 3, time is divided in a series of time slots 304, 308, 312, and 316. While prior art TDMA systems use fixed-length time slots, the time slots 304-316 have different lengths. As used herein, the term "time slot" refers to any predetermined time period during which a particular set of wireless nodes can transmit message data. As described below, some intermediate slave wireless nodes receive messages from one or more slave wireless nodes during a one time slot, and retransmit the previously received messages during a later time slot. During each one of the time slots 304-316, at least one slave wireless node communicates with the master wireless node in the wireless network. As described below, the length of the time slots varies to enable a single slave wireless node to transmit data that the slave wireless node receives and aggregates from other slave wireless nodes in the network. For cases where perfect aggregation is possible, the slot size remains same for all slots. As an example, when the data size is fixed and every node modifies the value at predefined position then the slot size remains same as data size is same. The master wireless node only has to establish a subset of the slave wireless nodes that transmit aggregated data from other slave wireless nodes in the network. The master wireless node does not have to establish a direct communication session with each slave wireless node in the network, and does not incur the fixed overhead required to establish communication sessions with each of the slave wireless nodes. Thus, the total communication time required to receive data from each of the slave wireless nodes is reduced in comparison to an arrangement where the master wireless node communicates with each of the slave wireless nodes individually. As depicted in FIG. 3, the time slots 304-316 are repeated in a cyclical manner over time beginning with the shortest time slot 304 and ending with the longest time slot 316 before returning to the shortest time slot 304 in a subsequent cycle.

FIG. 3 depicts time slots for a network having N nodes, which are divided into n+1 individual groups according to the following equation 1: $N = \Sigma_{i=1}^{n+1} |S_i|$ where $i^{th}$ group is denoted by $S_i$. During $i^{th}$ time slot of every periodic cycle, the master wireless node collects data from a group leader slave wireless node of group $S_i$. This is possible only when the time required to collect data from $S_i$ slot requires maximum one more slot to collect data from $S_{i-1}$ group. i.e. $T_i = T_{i-1} + 1$ (equation 2). By the $i^{th}$ slot the group leader has aggregated data of all other slave wireless nodes of group $S_i$. Also, to minimize number of sub-groups, the number of slave wireless nodes in each group increases, so is the aggregated data and therefore the length of the corresponding time slot for the group $S_i$ also increases to enable a group leader slave wireless node in the group to transmit data from each of the slave wireless nodes in the group to the master wireless node.

As described in more detail below, the slave wireless nodes are arranged to minimize a total number of time slots that are required for the master wireless node to communicate with each of the slave wireless nodes in the wireless network as set forth in the following equations 3 and 4: $|S_1| < |S_2| < \ldots < |S_n|$ and $|S_{n+1}|=N-\Sigma_{i=1}{}^n|S_i|$. With such a tree structure number of nodes scheduled in a given slot is given by a reverse order, i.e. $|S_{n+1}|, |S_n|, \ldots, |S_2|, |S_1|$, thus requiring (n+1) total slots to collect data from all N nodes. Further, total number of frequencies required for such a distributions is then given by maximum of $(|S_{n+1}|, |S_n|, \ldots, |S_2|, |S_1|)$, i.e. maximum of $(|S_{n+1}|, |S_n|)$. A maximization process and minimization process organize the slave wireless nodes into groups that satisfy the preceding equations 1-3. The following equations describe a selection of slave wireless nodes that satisfy the maximization bound: $|S_x|_{max}=1+\Sigma_{i=}{}^{x-1}|S_i|_{max}=2|S_{x-1}|_{max}=2^{x-1}$. The following equations describe the minimization process: $|S_x|_{min}=1+|S_{x-1}|_{min}=1+(x-1)=x$. Thus, after application of the maximization process, the number of slave wireless nodes that are assigned to each group increases by a factor of two as additional groups are added to accommodate the slave wireless nodes in the system. After application of the minimization process, the number of slave wireless nodes in each group increases by one as additional groups are added to accommodate the slave wireless nodes in the system.

In FIG. 3, the time slots $S_1$-$S_{n+1}$ correspond to a single cycle of operation where each of the slave wireless nodes sends or receives a single fixed-size set of data with the master wireless node. The wireless network system repeats the cycle to enable the master wireless node to communicate with each of the slave wireless nodes at regular intervals. If the cycle time for the entire network is less than a predetermined maximum communication time limit, then the network meets real-time requirements for communication within a maximum bounded communication latency time limit.

During transmission of data, each communication session includes data that require a predetermined amount of time d to be transmitted from each node. In one embodiment, each node transmits data with a fixed time length d during a single time slot. Each communication session includes a fixed time overhead o that includes the time required to establish a communication session between the master wireless node and the slave wireless node. A group of nodes $S_i$ includes $|S_i|$ data messages (e.g. $|S_3|$ includes three nodes with three data messages). The master wireless node communicates with a single slave wireless node in the group, with the total time $t_i$ required for the transmission in the following equation: $t_i=o+|S_i|d$.

Figure 4:
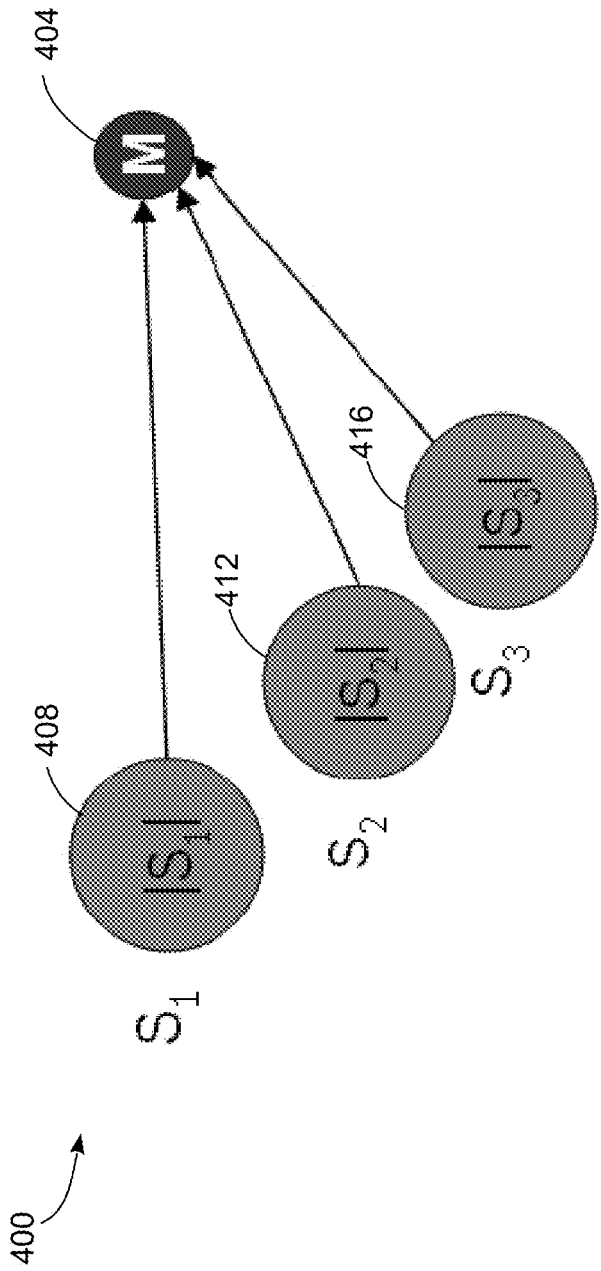
FIG. 4 is a diagram of a wireless network including groups of slave wireless nodes that communicate with a master wireless node.

FIG. 4 depicts one embodiment of a wireless network 400 including a master wireless node 404 and three groups of slave wireless nodes 408, 412, and 416. As described below, the number of slave wireless nodes in each group increases up to a predetermined limit that is based on the number of independent channels that are available for use in the network. For example, in FIG. 4 the group 408 ($S_1$) includes a single slave wireless node, the group 412 ($S_2$) includes two slave wireless nodes, and the group 416 ($S_3$) includes three or four slave wireless nodes depending on applicable minimization/maximization rule respectively. Within each group a single slave wireless node, which is referred to as a group leader, aggregates data from other slave wireless nodes in the group. The group leader sends the aggregated data to the master wireless node 404 during the predetermined time slot for that group.

Figure 5A:
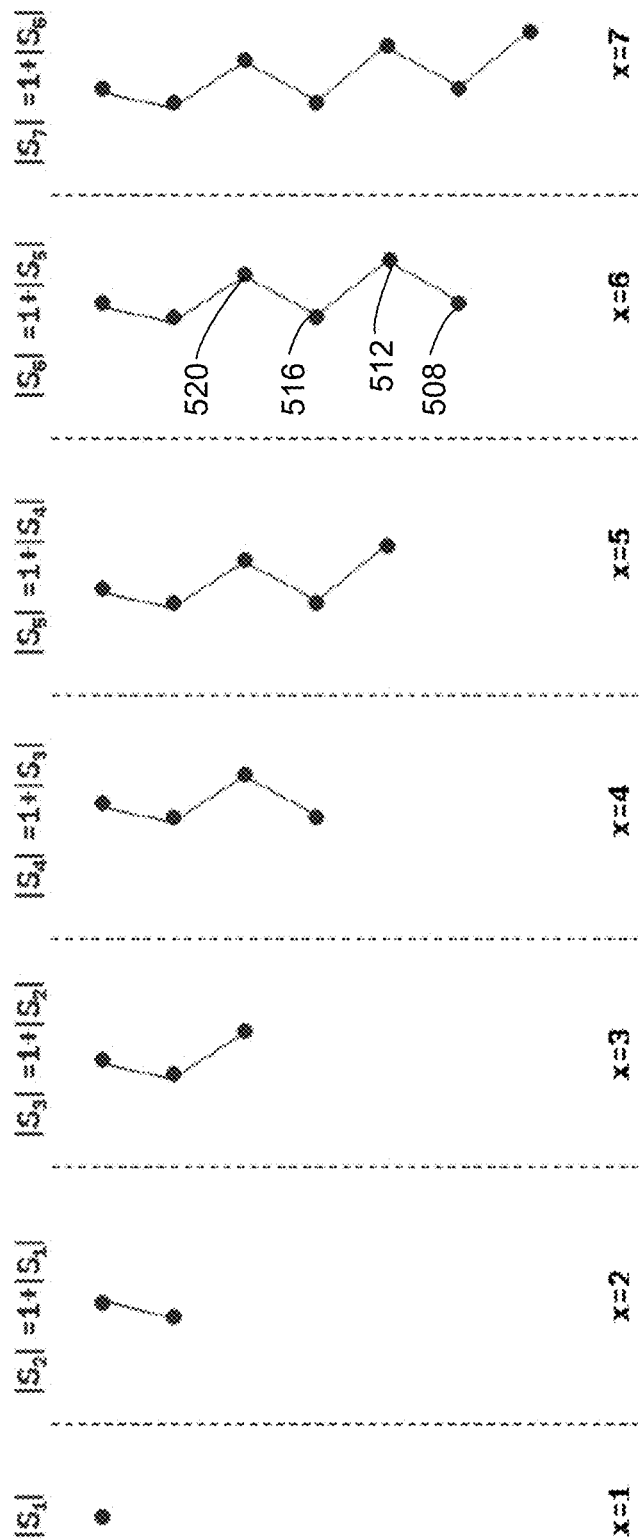
FIG. 5A is an arrangement of groups of slave wireless nodes that communicate with a master wireless node in a wireless network.
Figure 5B:
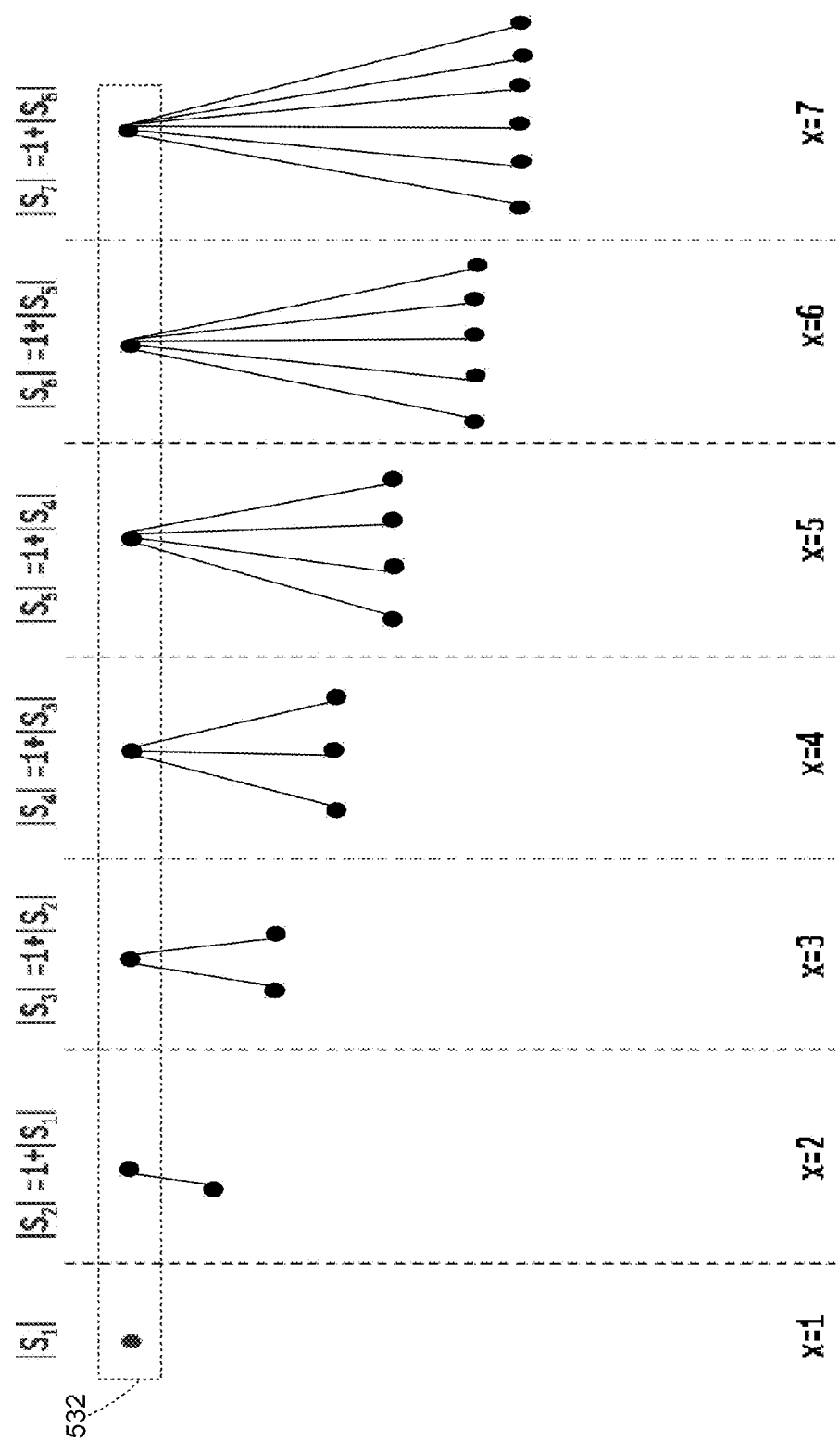
FIG. 5B is another arrangement of groups of slave wireless nodes that communicate with a master wireless node in a wireless network.

FIG. 5A and FIG. 5B depict tree structures for different group sizes of slave wireless nodes that are formed from the minimization grouping process. In FIG. 5A and FIG. 5B, each slave wireless node in a group $S_1$-$S_7$ is represented by a dot. Further, each group of slave wireless nodes uses a single transmission channel, and the groups of slave wireless nodes $S_1$-$S_7$ includes nodes that each transmit using different independent transmission channels to enable one node in each group to transmit during a single time slot. As seen below, the top slave wireless node in each group relays data to the master wireless node (not shown). The top slave wireless node in each group is also referred to as a group leader node. The slave wireless nodes transmit data to their parent slave wireless node and thus propagate data from the bottom of the graph to the top in FIG. 5A. For example, the node 508 transmits data to the node 512. The node 512 then transmits data for the node 508 in addition to data generated by the node 512 to node 516. The node 516 then transmits the data from nodes 508 and 512 in addition to the data generated by the node 516 to the node 520, etc. The time slot for each transmission increases in length with reference to the amount of data from other nodes in the group that are being transmitted to another node in the group.

FIG. 5B depicts another configuration for minimization grouping. In FIG. 5B, each slave wireless node transmits data to a group leader node during a predetermined time slot without transmitting to an intermediate slave wireless node in the group. Each of the group leader nodes, which are labeled as nodes 532 in FIG. 5B, transmits data that are aggregated from all the nodes in the group to a master wireless node (not shown) during one of the predetermined time slots such as the time slots depicted in FIG. 3. Thus, in the group $S_1$, the group leader node transmits data only for itself, while in the group $S_7$ the group leader node transmits data that are aggregated from each of six slave wireless nodes in the group and its own data to the master wireless node.

Figure 6:
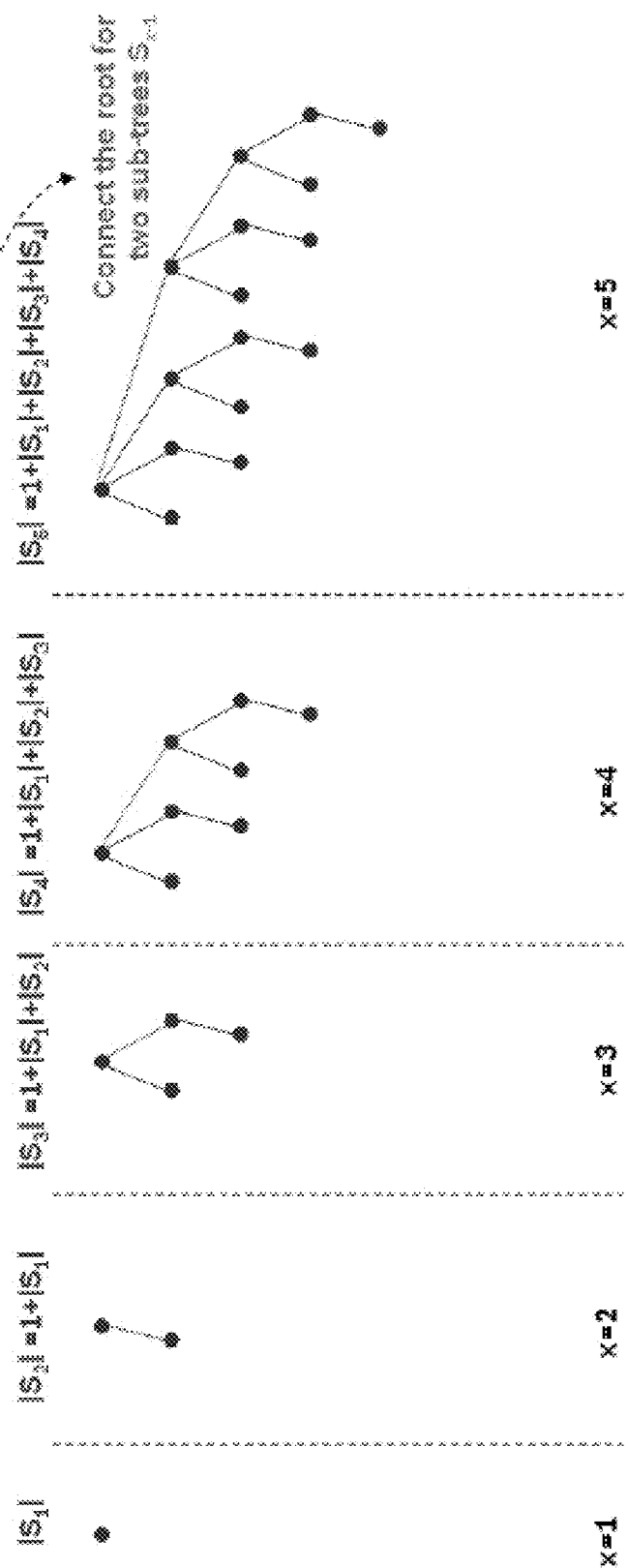
FIG. 6 is an arrangement of groups and sub-groups of slave wireless nodes that communicate with a master wireless node in a wireless network.

FIG. 6 depicts tree structures in slave wireless node groups $S_1$-$S_5$ that satisfy the maximization grouping process. Thus, each group in the series of groups $S_1$-$S_5$ includes twice as many slave wireless nodes as the preceding group. In the configuration of FIG. 6, the group $S_1$ includes a single node, $S_2$ adds another node, $S_3$ adds another group of two nodes with the same configuration as $S_2$, $S_4$ adds another group of four nodes with the same configuration as $S_3$, and $S_5$ adds another group of eight nodes with the same configuration as $S_4$. The additional nodes in each group are connected to the group leader node for the corresponding group in the tree structures of FIG. 6. Each of the groups $S_1$-$S_5$ in FIG. 6 includes a group leader slave wireless node at the top of each group that receives aggregated data from the other slave wireless nodes in the group.

Figure 7:
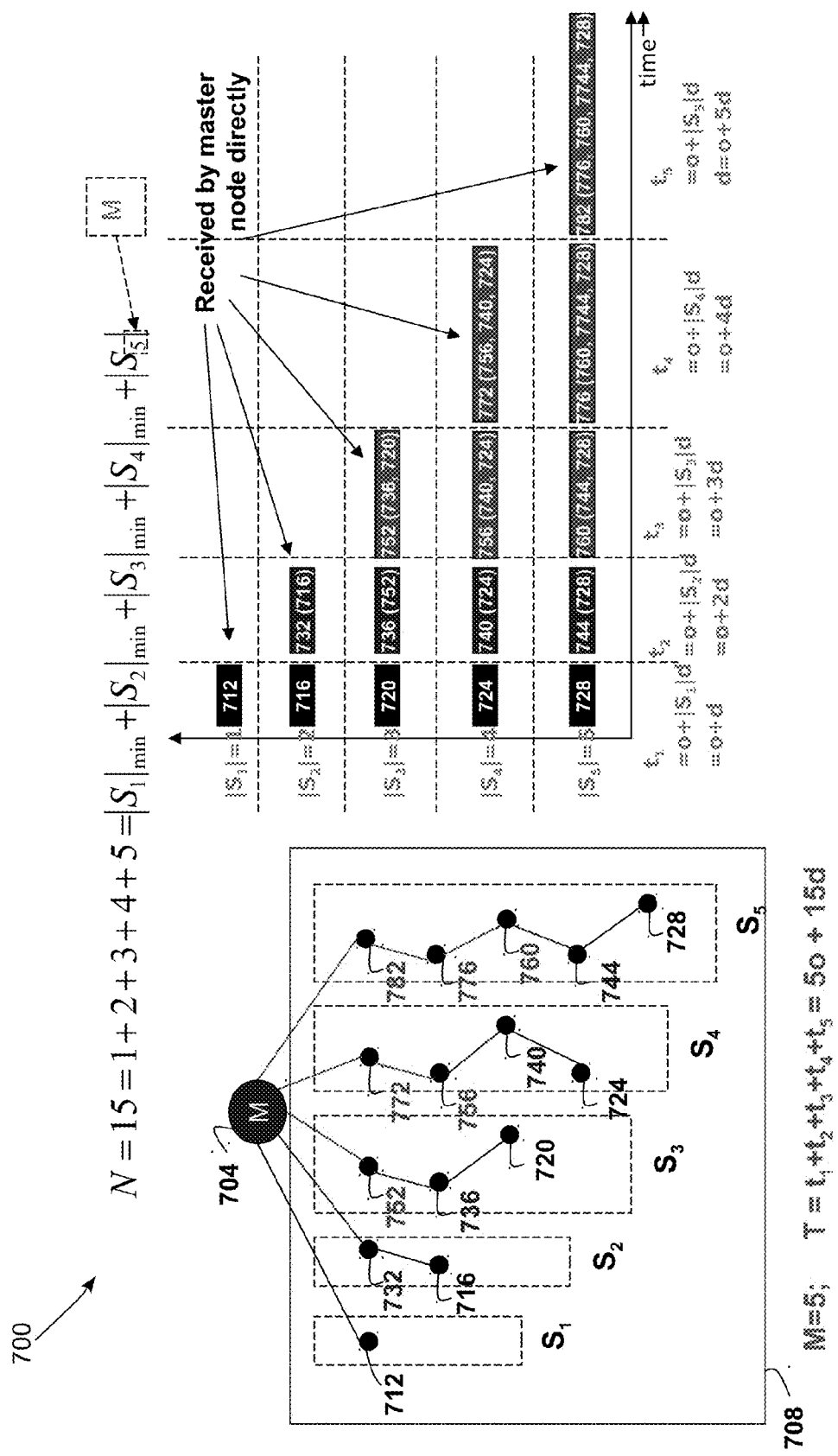
FIG. 7 is another arrangement of slave wireless nodes and a master wireless node in a wireless communication network that are arranged to optimize data collection from slave wireless nodes with each sub-group having minimum number of slave wireless nodes.

FIG. 7 depicts a network system 700 including a master wireless node 704 and fifteen slave wireless nodes 708 that are divided into five groups $S_1$-$S_5$. The network 700 is configured using the $|S_x|_{min}$ minimization grouping, with each group in the series $S_2$-$S_5$ including one more slave wireless node than the previous group. In the configuration of FIG. 7, one node in each group transmits during each time slot $t_1$-$t_5$ of a TDMA scheme. For example, during time slot $t_1$, each of the nodes 724 and 728 from the groups $S_1$-$S_5$, respectively, transmits data to another slave wireless node or, in the case of node 712, to the master wireless node 704 using a different independent radio channel. During time slot $t_2$, each of the nodes 732, 736, 740, and 744, transmits data for groups $S_2$-$S_5$, respectively, including data for themselves and for data from the respective one of nodes 716-728 that transmitted during the previous slot $t_1$. The time slot $t_2$ is longer than $t_1$ because each transmitting node transmits more data than during the time slot $t_1$. The transmission process continues in a similar manner for time slots $t_3$-$t_5$. The total length of the subsequent time slots $t_3$-$t_5$ increases to accommodate the increasing amounts of data that are transmitted during each of the subsequent time slots.

While the total length of the time slots increases from time slot $t_1$-$t_5$ due to the extra data transmission time d in each time slot, the time requirement for the fixed overhead o, however, remains constant for all of the time slots $t_1$-$t_5$. Additionally, during each time slot, one of the group leader nodes transmits data to the master wireless node 704. Thus, in the network 700, the total time required for each of the slave wireless nodes 708 to transmit data to the master wireless node 704 is: $T=\Sigma_{i=1}^{5} t_i = 5o+15d$, where the total transmission time is reduced from a configuration where the master wireless node 704 communicates with each of the slave wireless nodes 708 individually, which would require a total time of $15o+15d$. The configuration of the network 700 uses parallel transmissions over multiple independent radio channels to reduce the total fixed overhead time o required for the master wireless node 704 to communicate with each of the slave wireless nodes 708 through the groups $S_1$-$S_5$. While the network 700 includes parallel transmission using different independent radio channels, the master wireless node 704 and each of the slave wireless nodes 708 are only required to transmit or receive using a single radio channel during any given time slot.

Figure 8:
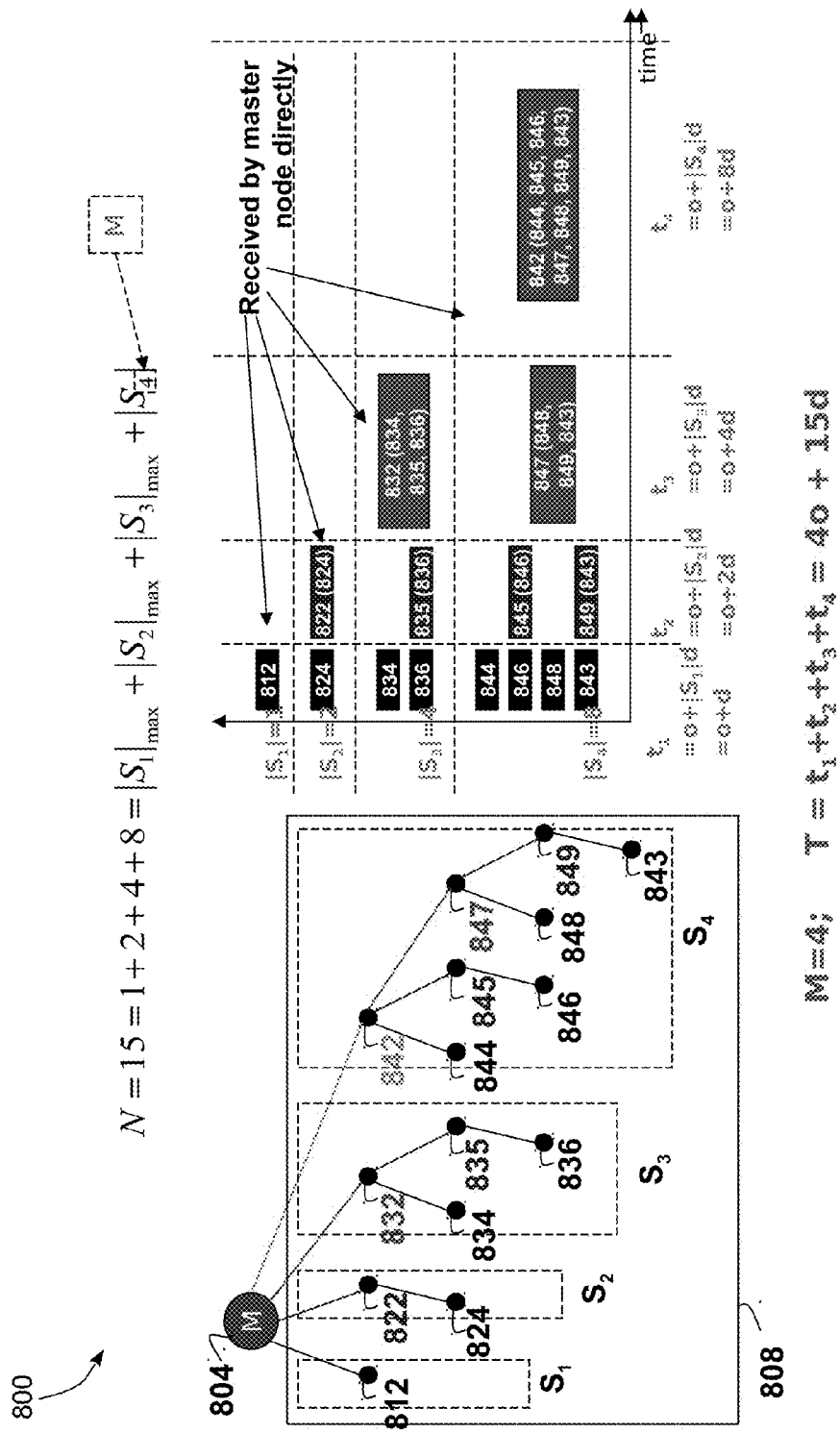
FIG. 8 is another arrangement of slave wireless nodes and a master wireless node in a wireless communication network that are arranged to optimize data collection from slave wireless nodes with each sub-group having maximum number of slave wireless nodes.

FIG. 8 depicts another network system 800 including a master wireless node 804 and fifteen slave wireless nodes 808 that are divided into four groups $S_1$-$S_4$. The network 800 is configured using the $|S_x|_{max}$ maximization grouping method, with each group in the series $S_2$-$S_3$ including twice the number of slave wireless nodes as the previous group. In the system 800, the groups $S_1$-$S_4$ are configured to transmit and receive data using different independent radio channels. In the system 800, one or more of the slave wireless nodes in each of the groups $S_1$-$S_4$ transmits during each of the time slots $t_1$-$t_4$. For example, during time slot $t_1$, each of the nodes 812, 824, 834, 836, 844, 846, 848, and 843 transmit to their respective parent nodes in groups $S_1$-$S_4$, respectively. During the time slot $t_2$, the group leader node 822 in group $S_2$ transmits data for itself and for the node 824 to the master wireless node 804, and the corresponding time slot $t_2$ is longer than the time slot $t_1$. During time slot $t_2$, slave wireless nodes 835, 845, and 849 also transmit their data (including that of their child nodes, if any) to their respective parent nodes, 832, 842, and 847. In the configuration of FIG. 8, the total time for the master wireless node 804 to communicate with each of the fifteen slave wireless nodes 808 through the groups $S_1$-$S_4$ with a total time of $T=\Sigma_{i=1}^{4} t_i = 4o+15d$, instead of the $15o+15d$ time that would be required for the master wireless node to communicate with each of the slave wireless nodes individually. The configuration of FIG. 8 requires a maximum($|S|$, $|S_2|,|S_3|,|S_4|,|S_5|$)=8 independent channels to operate.

Figure 9:
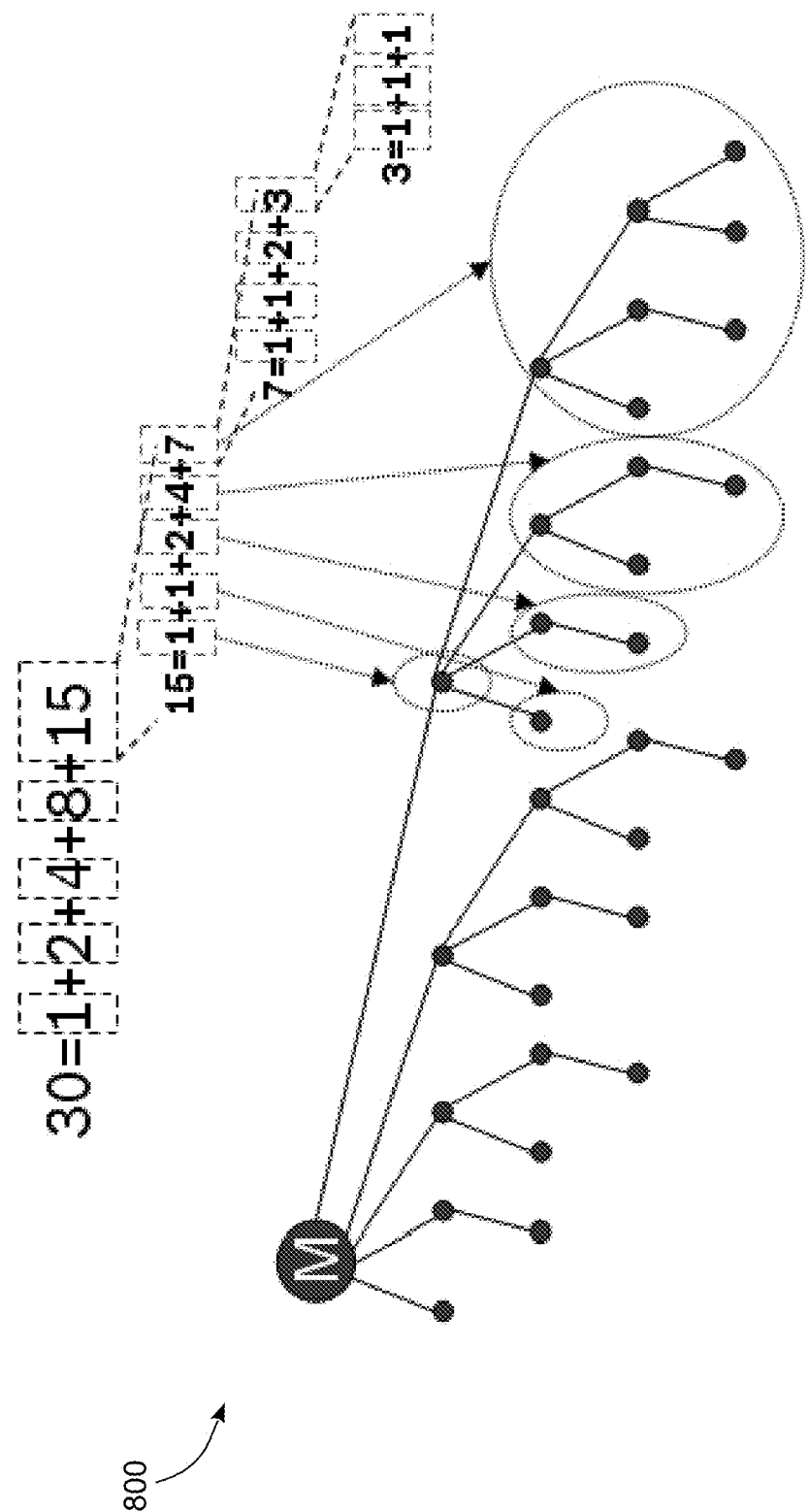
FIG. 9 is a modification of the arrangement of slave wireless nodes depicted in FIG. 8 for generation of an optimal tree structure using set of sub-trees where each sub-tree is generated using an algorithm in recursive manner until the tree is generated.

FIG. 9 depicts a process for configuring slave wireless nodes in a group for a system that satisfies the $|S_x|_{max}$ equation when the group does not include a number of slave wireless nodes that are a power of two, such as 15 slave wireless nodes instead of $2^4=16$ slave wireless nodes in the example of FIG. 9. In FIG. 9, the group $S_5$ includes fifteen slave wireless nodes, and the slave wireless nodes are configured using sub-trees of sizes one, two, four and seven, that comply with the $|S_x|_{max}$ equation above. In the sub-tree, one additional node accounts for the master wireless node, which is omitted from the full network system 800, for a total of 16 nodes in the sub-tree. The generation of sub-trees continues iteratively in situations where the remaining slave wireless nodes do not correspond to an integer power of two until all the slave wireless nodes in the network are arranged into a group.

FIG. 10 depicts mathematical equations for formulating the tree structure for N nodes given a predetermined number of independent channels f. The equations in FIG. 10 include both the $|S_x|_{max}$ (Max Case) and $|S_x|_{min}$ (Min Case) systems described above.

Figure 11:
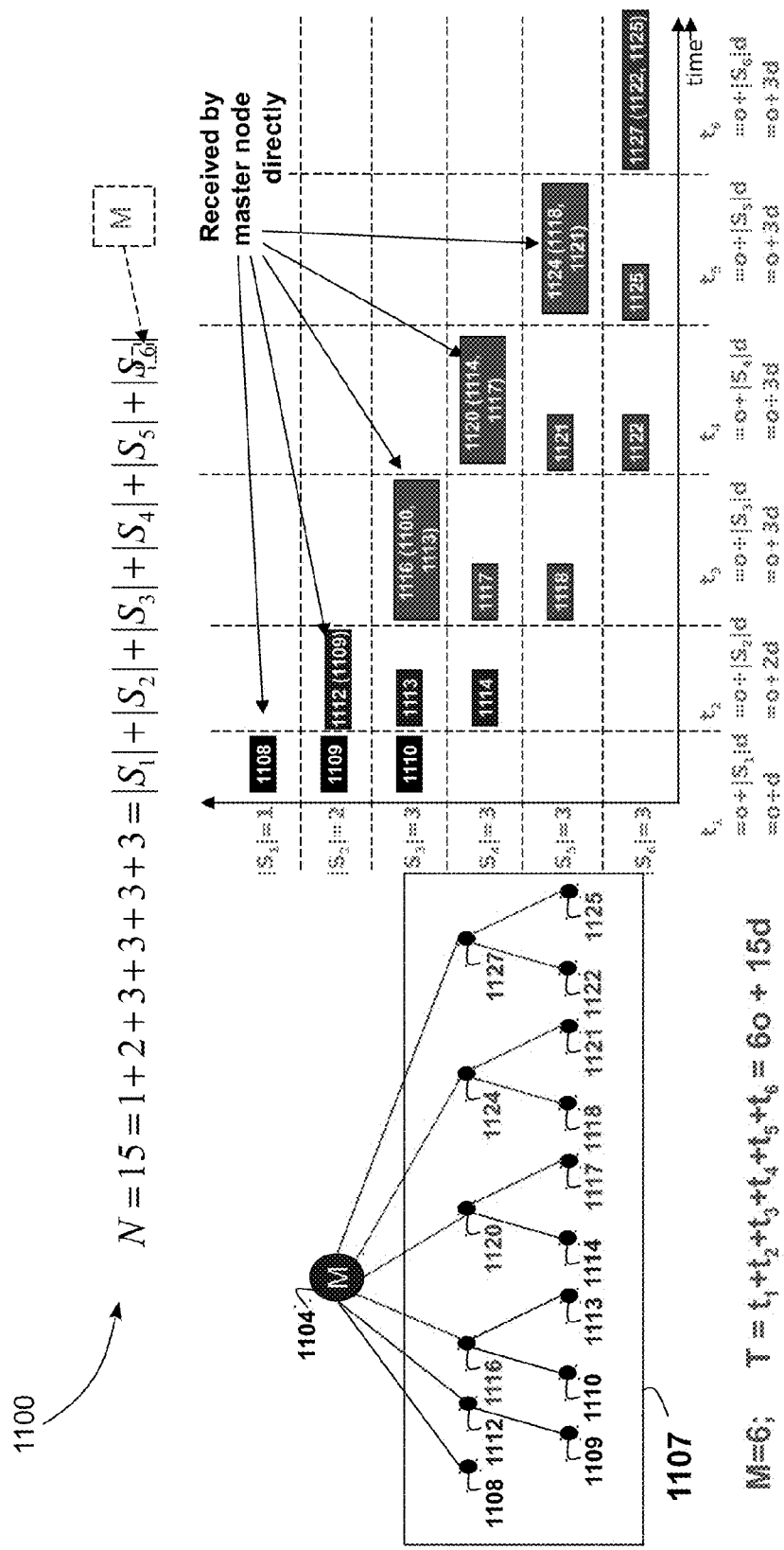
FIG. 11 depicts another configuration of slave wireless nodes and a master wireless node in a wireless network where the number of available independent channels is limited to three.

The wireless network systems 700 and 800 described above are each implemented in an environment where the number of available independent channels f is not a limiting factor to the formation of the network trees. For example, the system 700 uses up to five independent channels, and the system 800 uses up to eight independent radio channels. In some network systems, however, the number of nodes N is much larger than the number of available independent radio channels f. In such case, to satisfy equation 2, the maximum size of any sub-group is restricted to the number of channels f. For example, FIG. 11 depicts a network system 1100 including a master wireless node 1104 and fifteen slave wireless nodes 1108 that are divided into six groups $S_1$-$S_6$. In the network 1100, only three independent channels are available (f=3), with one channel being used by the group leader slave wireless nodes 1108 to communicate with the master wireless node 1104 and other two channels being used to communicate between the slave wireless nodes 1109 & 1110 and their respective group leader slave wireless nodes 1112 & 1116 in sub-groups groups $S_2$ & $S_3$. Note that sub-groups $S_4$-$S_6$ also have only three nodes. In the next time slot, the group leader 1112 transmits aggregated data of group $S_2$ to the master wireless node 1104. Meanwhile in the same time slot the slave wireless nodes 1113 & 1114 transmit their data to parent nodes 1116 & 1120, respectively. In the next slot group leader 1116 transmits the aggregated data of group $S_3$ to the master wireless node 1104. Using the maximization arrangement $|S_x|_{max}$ would result in a group $S_3$ having four nodes with only three independent channels, which would not enable aggregation of data from three slave wireless nodes at the group leader node in two time slots. Therefore, the $|S_x|_{max}$ arrangement fails to meet the requirement that at least one node in the group be able to transmit in each time slot since during time slot 3 the group leader 1116 would be unable to transmit the aggregated data. Consequently, the maximum sizes of the groups $S_4$-$S_6$ are limited because of the limited number of available independent radio channels. In the system 1100, the total time taken for the time slots $t_1$-$t_6$ is $T=\Sigma_{i=1}^{6} t_i=6o+15d$, which is less efficient than the systems 700 and 800 that are unconstrained by the number of available channels. The total transmission time in the system 1100 is, however, still less than the time of $15o+15d$ that would be required for the master wireless node 1104 to communicate with each slave wireless nodes individually.

In the systems 700 and 800 depicted above, the number of slave wireless nodes in each of the groups varies, with the number of nodes in successive groups $S_n$ increasing with the value of n. In another configuration, the network is configured with an equal number of nodes f in each of the groups that are included in the network system, where f is the number of independent radio channels that are available to the network system. A configuration where each group includes f nodes is the most optimal configuration that enables operation with a minimum additional fixed overhead time o for communication between the master wireless node and the slave wireless nodes. When the number of nodes N is large, each node is provided an equal opportunity to transmit. The efficiency of the configuration where each group includes f nodes scales as the number of nodes N increases in a wireless network where a comparatively small number of independent channels f are available for transmission. When the number of nodes N is small or comparable to the number of available channels f, then some nodes have additional opportunities to transmit data. Nodes with additional opportunities to transmit data optionally transmit redundant messages from other nodes that experience poor channel conditions to increase the likelihood that the master wireless node receives data from nodes that experience the poor channel conditions.

Figure 12:
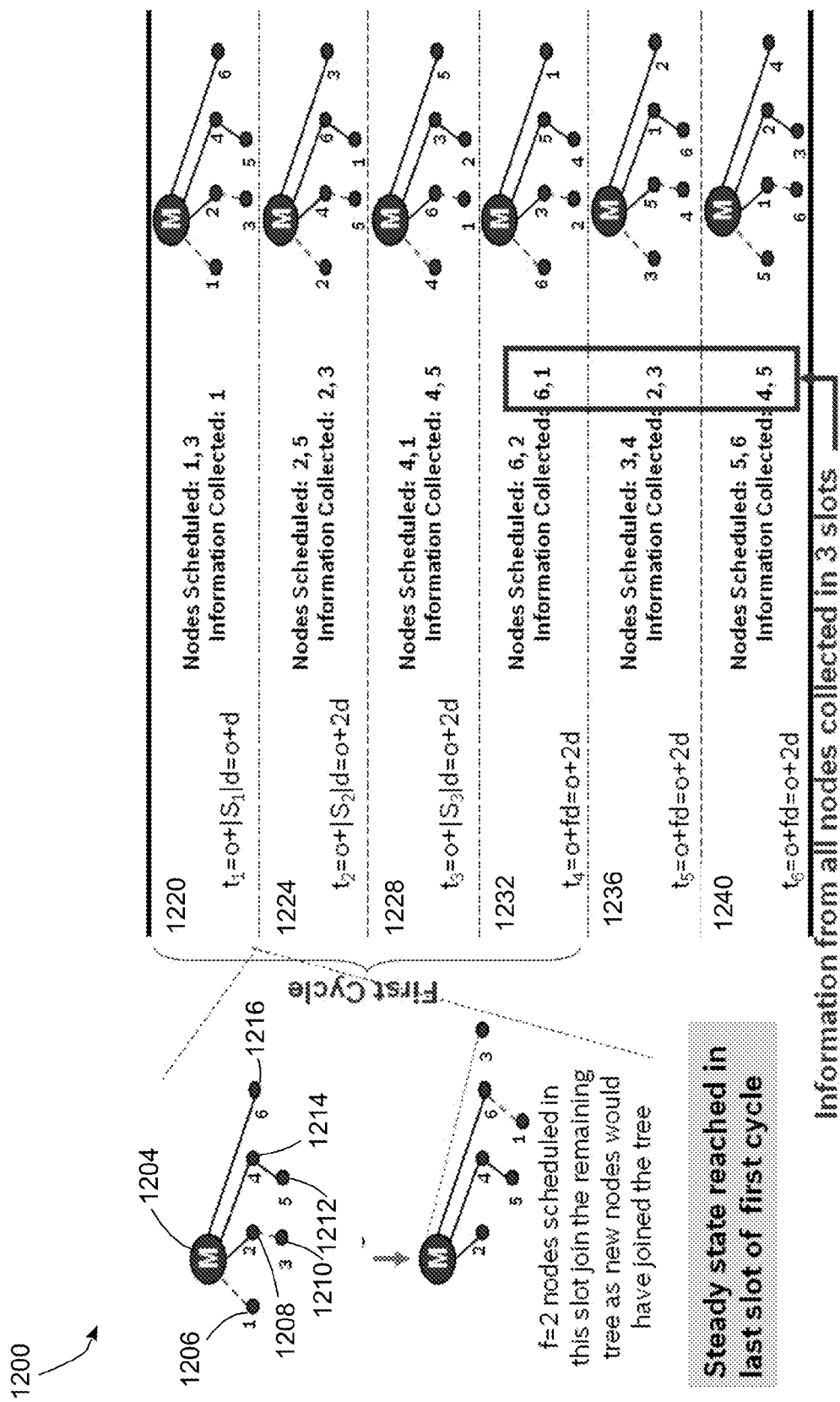
FIG. 12 depicts modifications to an arrangement of slave wireless nodes and a master wireless node in a cyclical process that reconfigures the slave wireless nodes in the wireless communication network dynamically to generate an optimal configuration for data collection under steady state conditions.

For example, in one embodiment a wireless network uses sixteen independent channels, and the N slave wireless nodes in the network are divided into N/16 groups of sixteen nodes each with one group including less than sixteen nodes if the number N is not evenly divisible by sixteen. FIG. 12 depicts multiple configurations of nodes in a network 1200 that includes six slave wireless nodes and two independent channels. During each time slot $t_i$ to $t_6$, the nodes in the network tree are reconfigured to enable one node in each of the four independent channels to transmit data. Further, in a steady state condition reached at slot 4, the data from six slave wireless nodes can be collected in 3 time slots, which depicts an optimized use of the two available channels for communication using six slave wireless nodes.

In FIG. 12, the master wireless node 1204 assigns different communication orders to slave wireless nodes 1206, 1208, 1210, 1212, 1214, and 1216. In the configuration of FIG. 12, the wireless communication system 1200 has two available independent channels (f=2) for six slave wireless nodes (N=6). The assignments for each of the slave wireless nodes 1206-1216 are depicted in the diagrams 1220-1240 as the master wireless node 1204 generates new assignments for the slave wireless nodes 1206-1216. As depicted in diagram 1220, the master wireless node 1204 begins with an arbitrary arrangement of the slave wireless nodes using the maximization-minimization process described above based on the number of available channels and number of slave wireless nodes. The nodes 1206-1216 are assigned numbers (1-6) in each of the diagrams 1220-1240. The master wireless node 1204 identifies the nodes that transmit data to the master wireless node during a first time slot (graph 1220) and second time slot (graph 1224) that is longer than the first time slot. Because of the intermediate slave wireless nodes, the master wireless node 1204 receives data from some of the slave wireless nodes in the time slot after the slave wireless nodes have transmitted data to one of the intermediate slave wireless nodes. The master wireless node 1204 reassigns transmission orders for the slave wireless nodes 1206-1216 as depicted in the graphs 1220-1240 until reaching a "steady state" condition where the master wireless router receives messages from all of the slave wireless nodes within a predetermined number of time slots. The master wireless node 1204 continues to rotate the assignment of the slave wireless nodes in a cyclical manner in the steady state to enable transmission of messages in a minimum number of time slots given a constraint that each group of slave wireless nodes cannot transmit during each time slot because of a limited number of available channels.

To reassign the slave wireless nodes, the master wireless node 1204 identifies the slave wireless nodes that transmitted during a first time slot, and then reassigns the identified nodes to a new group, where each group has the maximum number of slave wireless nodes that are dictated by the maximum number of available channels f. For example, in FIG. 12 the nodes 1206 (1) and 1210 (3) transmit during the first time slot 1220. The master wireless node 1204 then reassigns the groups for these nodes in the same manner as adding new nodes to the wireless communication system and the locations in the tree that were occupied by these slave wireless nodes are occupied by the next set of slave wireless nodes that transmit data during the next time slot. As depicted in the time slot 1224, the wireless nodes 1206 (1) is reassigned to be a leaf node from the slave wireless node 1216 (6) and the wireless node 1210 (3) becomes a new intermediate leaf node. The intermediate node 1208 (2) is promoted the position in the tree that was filled by node 1206 (1), and the nodes 1214 (4) and 1212 (5) are promoted to the location in the tree that was previously filled by the slave wireless nodes 1208 (2) and 1210 (3), respectively. The process continues during each subsequent time slot where the master wireless node reassigns the groups for the nodes that have transmitted during the previous time slot to "wrap around" to the end of the tree.

The wireless system 1200 eventually reaches a "steady state" that is depicted in the time slots 1232-1240 where the master wireless node 1204 receives messages from each of the slave wireless nodes within a predetermined minimum number of time slots. In the steady state, only two of the groups of slave wireless transceivers include a wireless transceiver that transmits data during any single time slot. The other groups of wireless transceivers remain dormant until they master wireless node 1204 schedules them for transmission. The limitations in the system 1200 are due to the fact that the number of slave wireless nodes in the system 1200 is too large for there to be a transmitting wireless node during each time slot due to the limited number of available channels. In the illustrative embodiment of FIG. 12, there are f=2 available channels and a total of six slave wireless nodes, so the minimum number of time slots is three (6 messages for 6 nodes/2 messages per slot=3 slots in an optimal steady-state condition). In the configuration of FIG. 12, the minimum number of time slots to receive messages from the six slave wireless nodes using two channels is three time slots or T=3o+6d. The master wireless node 1204 reaches the steady state during the time slots depicted in diagrams 1232-1240 and continues using the cycle of wireless node assignments from the diagrams 1232-1240 during subsequent time slots in the steady state operation.

To generate the configuration of the wireless communication system 1200, the controller in the master wireless node 1204 generates the different assignments for each of the slave radio nodes. The master wireless node 1204 transmits a broadcast message to all of the slave wireless nodes that includes the assignments including the channels that each slave radio node should use for transmission, the time slots for transmission, and the parent-child relationships to assign each slave radio node as a leaf node or as an intermediate slave radio node with one or more levels of intermediate slave radio nodes leading to the master radio node 1204.

Figure 13:
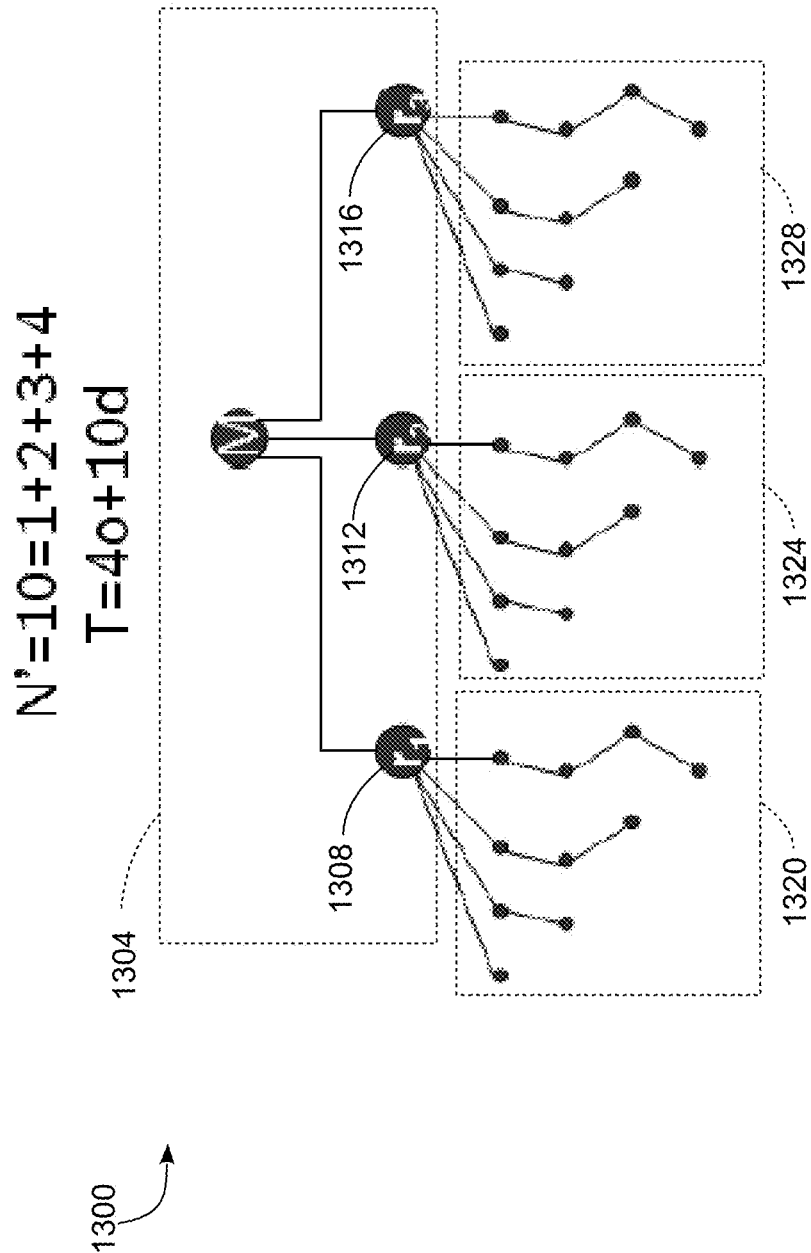
FIG. 13 depicts another embodiment of a wireless communication network with a master wireless node that is configured to send and receive data using two or more independent communication channels concurrently for different groups of slave wireless nodes.

In the embodiments depicted above, the master wireless node is configured to send and receive data using a single radio channel during a single time slot. The master wireless node can change frequencies between time slots for different slave wireless node groups in some embodiments, but does not transmit and receive data using two or more independent radio channels simultaneously. In another embodiment depicted in the example network 1300 of FIG. 13, again with 30 slave wireless nodes as in system 700 & 800. However, in this example network, the master wireless node 1304 includes hardware and software modules that enable simultaneous communication using three independent channels. In the network 1300, the master wireless node 1304 includes transceivers 1308, 1312, and 1316 and accompanying control systems that each act as a master wireless node for independent trees of slave wireless nodes 1320, 1324, and 1328, respectively. Each one of the independent trees 1320-1328 includes ten slave wireless nodes in the network 1300. In the configuration of FIG. 13, the master wireless node 1304 communicates with thirty slave wireless nodes in the network 1300 in a total time of T=4o+10d.

In addition to the embodiments described above, further enhancements to wireless communication networks include the following methods and system configurations. Methods for wireless communication include variable slot size include multiple transmissions for leaf wireless nodes when slot time is larger than the transmission time for an individual leaf wireless node. The size of the time slot is decided by the maximum sized aggregated data packet for the master wireless node. Therefore, nodes sending small data in that slot may transmit that data multiple times, enhancing the reliability of their communication. In another configuration, multiple intermediate wireless nodes receive the same data for increased reliability. As wireless communication is a broadcast, the nodes that are not participating in active transmission or reception optionally perform passive listening and transmit the passively received data along with their aggregated data to the master wireless node for added reliability. The size of a time slot increases with redundant aggregated data.

In another configuration, the wireless network includes multiband wireless nodes. To enhance the parallel communication and mitigate interference, all nodes are optionally equipped with multiple radio technologies spawning several bands. In another method, the formation process is based on a bi-directional channel matrix. In this process, the individual nodes in the selected trees are selected utilizing the channel information of the nodes rather than being assigned randomly after the tree structure is generated. More specifically, nodes with poor channel conditions may be selected as leaf wireless nodes to reduce the number of transmissions that are sent directly to the master wireless node. Instead these nodes may have better channel quality with other intermediate wireless nodes and may thus act as child nodes for those respective intermediate wireless nodes. In a cyclical network configuration, the nodes have different locations with the sub-trees during different cycles. To enhance the reliability of communication and ensuring long-term fairness, the system arranges nodes in different locations within the same tree structure during different cycles of the communication system. This arrangement also ensures that child nodes are not penalized for the wrong choice of a parent node. In another configuration, machine learning processes provide long-term robust configurations for the nodes in the trees. The wireless network system includes a memory and a machine learning module that is, for example, incorporated in the master wireless node, to learn combinations of node assignments for the sub-tree structures that provide low failure rates over the course of operation of the wireless communication system.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following embodiments.

What is claimed:

1. A method of operating a wireless communication system comprising:
    transmitting with a transceiver in a first slave wireless node a first message to a master wireless node during a first predetermined time slot;
    transmitting with a transceiver in a second slave wireless node a second message to a first intermediate slave wireless node during the first predetermined time slot;
    transmitting with a transceiver in the first intermediate slave wireless node a third message including the second message to the master wireless node during a second predetermined time slot, the second predetermined time slot being longer than the first predetermined time slot;
    transmitting with a transceiver in a third slave wireless node a fourth message to a second intermediate slave wireless node during the first predetermined time slot;
    transmitting with a transceiver in a fourth slave wireless node a fifth message to a third intermediate slave wireless node during the first predetermined time slot;
    transmitting with a transceiver in the second intermediate slave wireless node a sixth message including the fourth message to the third intermediate slave wireless node during the second predetermined time slot; and
    transmitting with a transceiver in the third intermediate slave wireless node a seventh message including the sixth message and the fifth message to the master wireless node during third predetermined time slot, the third predetermined time slot being longer than the second predetermined time slot.

2. The method of claim 1, the transmission of the second message further comprising:
    transmitting with the transceiver in the first intermediate slave wireless node the third message including the second message and a fourth message generated in the intermediate slave wireless node.

3. The method of claim 1 wherein the first slave wireless node transmits the first message to the master wireless node using a first channel and the second slave wireless node transmits the third message to the first intermediate slave wireless node using a second channel, the first channel being different than the second channel.

4. The method of claim 1 wherein the third slave wireless node transmits the fourth message using a third channel that is different than both the first channel and the second channel and the fourth slave wireless node transmits the fifth message using a fourth channel that is different from any of the first, second, and third channels.

5. The method of claim 1 wherein the first intermediate slave wireless node transmits the third message using the first channel during the second predetermined time slot and the second intermediate slave wireless node transmits the sixth message using the second channel during the second predetermined time slot.

6. The method of claim 1 wherein the intermediate slave wireless node transmits the seventh message using the first channel during the third predetermined time slot.

7. A method of operating a wireless communication system comprising:
    transmitting with a transceiver in a first slave wireless node using a first channel a first message to a master wireless node during a first predetermined time slot;
    transmitting with a transceiver in a second slave wireless node using a second channel that is different than the first channel a second message to a first intermediate slave wireless node during the first predetermined time slot;
    transmitting with a transceiver in a third slave wireless node using a third channel that is different than both the first channel and the second channel a third message to a second intermediate slave wireless node during the first predetermined time slot;
    transmitting with a transceiver in the first intermediate slave wireless node using the first channel a fourth message to the master wireless node during a second predetermined time slot, the fourth message including the second message and the second predetermined time slot being longer than the first predetermined time slot;
    transmitting with a transceiver in the second intermediate slave wireless node using the second channel a fifth message to a third intermediate slave wireless node during the second predetermined time slot, the fifth message including the third message; and transmitting with a transceiver in the third intermediate slave wireless node using the first channel a sixth message to the master wireless node during a third predetermined time slot, the sixth message including the fifth message and the third predetermined time slot being longer than the second predetermined time slot.

8. The method of claim 7, the transmission of the fourth message further comprising:
transmitting with the transceiver in the first intermediate slave wireless node the fourth message including the second message and a seventh message generated in the first intermediate slave wireless node.

9. The method of claim 7, the transmission of the fifth message further comprising:
transmitting with the transceiver in the second intermediate slave wireless node the fifth message including the third message and a seventh message generated in the second intermediate slave wireless node.

10. The method of claim 9, the transmission of the sixth message further comprising:
transmitting with the transceiver in the third intermediate slave wireless node the sixth message including the fifth message, the seventh message, and an eighth message generated in the third intermediate slave wireless node.

11. A method for organization of wireless nodes in a wireless communication system comprising:
generating with a controller in a master wireless node assignment data for each slave radio node in a plurality of slave radio nodes to one group in a plurality groups for communication between the slave wireless nodes and the master wireless node in the wireless communication system, the generation of the assignment data further comprising:
assigning with the controller a first slave wireless node in the plurality of slave wireless nodes to a first group in the plurality of groups, the first slave wireless node being configured to transmit a first message to the master wireless node using a first channel during a first predetermined time slot; and
assigning with the controller a second slave wireless node and a third slave wireless node in the plurality of slave wireless nodes to a second group in the plurality of groups, the second slave wireless node being configured to transmit a second message to the third slave wireless node using a second channel during the first predetermined time slot and the third slave wireless node being configured to transmit a third message that includes the second message to the master wireless node using the first channel during a second predetermined time slot, the second predetermined time slot being longer than the first predetermined time slot; and transmitting, with a transmitter in the master wireless node the assignment data to the plurality of slave wireless nodes to configure the plurality of slave wireless nodes to transmit messages to the master wireless node according to the assignment data.

12. The method of claim 11, the generation of the assignment data further comprising:
assigning with the controller fourth, fifth, and sixth slave wireless nodes from the plurality of slave wireless nodes to a third group in the plurality of groups, the fourth slave wireless node being configured to transmit a fourth message to the fifth slave wireless node using a third channel during the first predetermined time slot, the fifth slave wireless node being configured to transmit a fifth message including the fourth message to the sixth slave wireless node using the second channel during the second predetermined time slot, and the sixth slave wireless node being configured to transmit a sixth message including the fifth message to the master wireless node using the first channel during a third predetermined time slot, the third predetermined time slot being longer than the second predetermined time slot.

13. The method of claim 11, the generation of the assignment data further comprising:
assigning with the controller fourth, fifth, sixth, and seventh slave wireless nodes from the plurality of slave wireless nodes to a third group in the plurality of groups, the fourth slave wireless node being configured to transmit a fourth message to the fifth slave wireless node using a third channel during the first predetermined time slot, the seventh slave wireless node being configured to transmit a fifth message to the sixth slave wireless node using a fourth channel during the first predetermined time slot, the sixth slave wireless node being configured to transmit a sixth message including the fifth message to the fifth slave wireless node using the second channel during the second predetermined time slot, and the fifth slave wireless node being configured to transmit a seventh message including the sixth message and the fourth message to the master wireless node using the first channel during a third predetermined time slot, the third predetermined time slot being longer than the second predetermined time slot.

14. The method of claim 11, the generation of the assignment data further comprising:
assigning with the controller a fourth slave wireless node and a fifth slave wireless node in the plurality of slave wireless nodes to a third group in the plurality of groups, the fourth slave wireless node being configured to transmit a fourth message to the fifth slave wireless node using the second channel during the second predetermined time slot and the fifth slave wireless node being configured to transmit a fifth message that includes the fourth message to the master wireless node using the first channel during a third predetermined time slot, the third predetermined time slot being the same length as the second predetermined time slot.

15. The method of claim 11 further comprising:
identifying with the controller in the master wireless node a number of available channels for use for communication with the slave wireless nodes; and
generating with the controller in the master wireless node the assignment data such that each group in the plurality of groups includes a number of slave wireless nodes that does not exceed the number of available channels.

16. The method of claim 15 further comprising:
receiving with a receiver in the master wireless node the first message from the first slave wireless node during the first predetermined time slot; and
generating with the controller in the master wireless node another assignment for the first wireless node to be in a third group in the plurality of groups in response to receiving the first message, the third group having a total number of slave wireless nodes that does not exceed the number of available channels after the other assignment of the first slave wireless node to the third group, and no wireless node in the third group being configured to transmit during the second predetermined time period.

* * * * *